(12) United States Patent
Wondo et al.

(10) Patent No.: US 11,720,573 B2
(45) Date of Patent: Aug. 8, 2023

(54) SYSTEMS AND METHODS FOR SELECTIVELY PREFETCHING DATA

(71) Applicants: Atlassian Pty Ltd., Sydney (AU); Atlassian Inc., San Francisco, CA (US)

(72) Inventors: Addo Wondo, Sydney (AU); Ahmed Saad, Sydney (AU); Geoff Sims, Sydney (AU); Penyo Atanasov, Sydney (AU); Shihab Hassan Hamid, Sydney (AU); Gaurav Awadhwal, Sydney (AU); Edison Rho, Auckland (NZ); Gilmar Jose Alves de Souza, Jr., Sydney (AU)

(73) Assignees: ATLASSIAN PTY LTD., Sydney (AU); ATLASSIAN US, INC., San Francisco, CA (US)

( * ) Notice: Subject to any disclaimer, the term of this patent is extended or adjusted under 35 U.S.C. 154(b) by 20 days.

(21) Appl. No.: 17/378,615

(22) Filed: Jul. 16, 2021

(65) Prior Publication Data

US 2022/0100768 A1    Mar. 31, 2022

Related U.S. Application Data

(63) Continuation of application No. 17/037,419, filed on Sep. 29, 2020, now Pat. No. 11,080,283.

(51) Int. Cl.
| | |
|---|---|
| *G06F 16/20* | (2019.01) |
| *G06F 16/2457* | (2019.01) |
| *G06N 20/00* | (2019.01) |
| *H04L 67/5681* | (2022.01) |
| *G06F 3/04842* | (2022.01) |

(52) U.S. Cl.
CPC ....... *G06F 16/24575* (2019.01); *G06N 20/00* (2019.01); *H04L 67/5681* (2022.05); *G06F 3/04842* (2013.01)

(58) Field of Classification Search
None
See application file for complete search history.

(56) References Cited

U.S. PATENT DOCUMENTS

| | | | |
|---|---|---|---|
| 6,055,650 A | 4/2000 | Christie et al. | |
| 6,085,193 A * | 7/2000 | Malkin | H04L 67/5681 709/200 |
| 6,098,064 A * | 8/2000 | Pirolli | G06F 16/9574 707/999.005 |
| 8,566,696 B1 | 10/2013 | Hamon et al. | |
| 8,671,246 B2 | 3/2014 | Toyoshima et al. | |
| 8,949,420 B2 | 2/2015 | Banavar et al. | |
| 2018/0115603 A1 * | 4/2018 | Hu | G06Q 50/01 |

* cited by examiner

*Primary Examiner* — Belix M Ortiz Ditren
(74) *Attorney, Agent, or Firm* — Brownstein Hyatt Farber Schreck, LLP

(57) ABSTRACT

Systems and methods for intelligently pre-fetching data for input controls are disclosed. In particular, the disclosed systems and methods predict whether an input control is likely to be edited and only pre-fetches data for the input controls that have a high likelihood of being edited. This way, the presently disclosed systems and methods not only reduce latency in displaying recommended data results for input controls that are likely to be edited but also reduces the number of calls made to the backend server to retrieve the data as the data is not retrieved for all rendered input controls, but only the ones that are likely to be edited.

20 Claims, 4 Drawing Sheets

SYSTEMS AND METHODS FOR SELECTIVELY PREFETCHING DATA

CROSS-REFERENCE TO RELATED APPLICATION(S)

This application is a continuation patent application of U.S. patent application Ser. No. 17/037,419, filed Sep. 29, 2020 and titled "Systems and Methods for Selectively Prefetching Data," the disclosure of which is hereby incorporated herein by reference in its entirety.

TECHNICAL FIELD

Aspects of the present disclosure are directed to data processing systems and more specifically to mechanisms for selectively prefetching data to reduce latency while preventing overloading the underlying database.

BACKGROUND

The developments described in this section are known to the inventors. However, unless otherwise indicated, it should not be assumed that any of the developments described in this section qualify as prior art merely by virtue of their inclusion in this section, or that those developments are known to a person of ordinary skill in the art.

Computer systems, when executing computer programs, frequently provide a user-interface displaying certain elements, which are fetched from an underlying database (local or remote) before the user interface can be rendered on a client device. The user interface often includes a graphical program interface that is part of the executing computer program, which may include one or more input controls for a user to input data into the computer system, including e.g., picker or selector controls. A selector control typically includes a text area to accept search characters and returns results from an underlying database that match the entered search characters. Often times when a user wishes to input data using one of these input controls, data for the input control is fetched from the underlying database when the user selects the input control and/or begins typing in the input control. If the number of options available in the underlying database are extensive, the computer program can take a finite amount of time to retrieve the underlying data and present it to the user. This latency in retrieving and displaying data for input controls is undesirable.

SUMMARY

In certain embodiments of the present disclosure a computer-implemented method is disclosed. The method includes receiving a recommendation request for pre-fetching data for an input control displayed in an object. The recommendation request includes an input control type identifier and a principal identifier of a principal user viewing the object. The method further includes retrieving feature data for the input control. The feature data may be retrieved based on the input control type identifier and the principal identifier received as part of the recommendation request. The method further includes determining likelihood of editing the input control based on the retrieved feature data and determining whether the determined likelihood of editing the input control exceeds a threshold. Upon determining that the likelihood of editing the input control exceeds the threshold, the method may further include adding the input control to a pre-fetch list and communicating the pre-fetch list to a client device. The client device may be configured to request a product platform to pre-fetch data for the input control in the pre-fetch list and store the pre-fetch data in a local cache of the client device.

In some embodiments, a computer-implemented method is disclosed. The computer-implemented method includes detecting display of an object in a user interface on a display of a client device. The object includes an input control. The method may further include generating a recommendation request for pre-fetching data for the input control. The recommendation request includes an input control type identifier and a principal identifier of a principal user viewing the object. The method further includes forwarding the recommendation request to a pre-fetch engine configured to determine a likelihood of editing the input control based on the recommendation request and receiving a determination of the likelihood of editing the input control from the pre-fetch engine. The determination is at least one of a positive likelihood of editing the input control and a negative likelihood of editing the input control. Upon receiving a positive likelihood of editing the input control from the pre-fetch engine, the method further includes requesting a product platform for data for the input control, receiving the data for the input control from the product platform, and storing the data for the input control in a local cache of the client device.

In some further embodiments, a computer system is disclosed. The computer system includes a processor and non-transitory computer readable medium storing sequences of instructions. When the sequence of instructions are executed by the processor, the processor receives a recommendation request for pre-fetching data for an input control displayed in an object. The recommendation request includes an input control type identifier and a principal identifier of a principal user viewing the object. The processor further retrieves feature data for the input control. The feature data may be retrieved based on the input control type identifier and the principal identifier received as part of the recommendation request. The processor also determines likelihood of editing the input control based on the retrieved feature data and determines whether the determined likelihood of editing the input control exceeds a threshold. Upon determining that the likelihood of editing the input control exceeds the threshold, the processor also adds the input control to a pre-fetch list and communicates the pre-fetch list to a client device. The client device may be configured to request a product platform to pre-fetch data for the input control in the pre-fetch list and store the pre-fetch data in a local cache.

Figure 1:
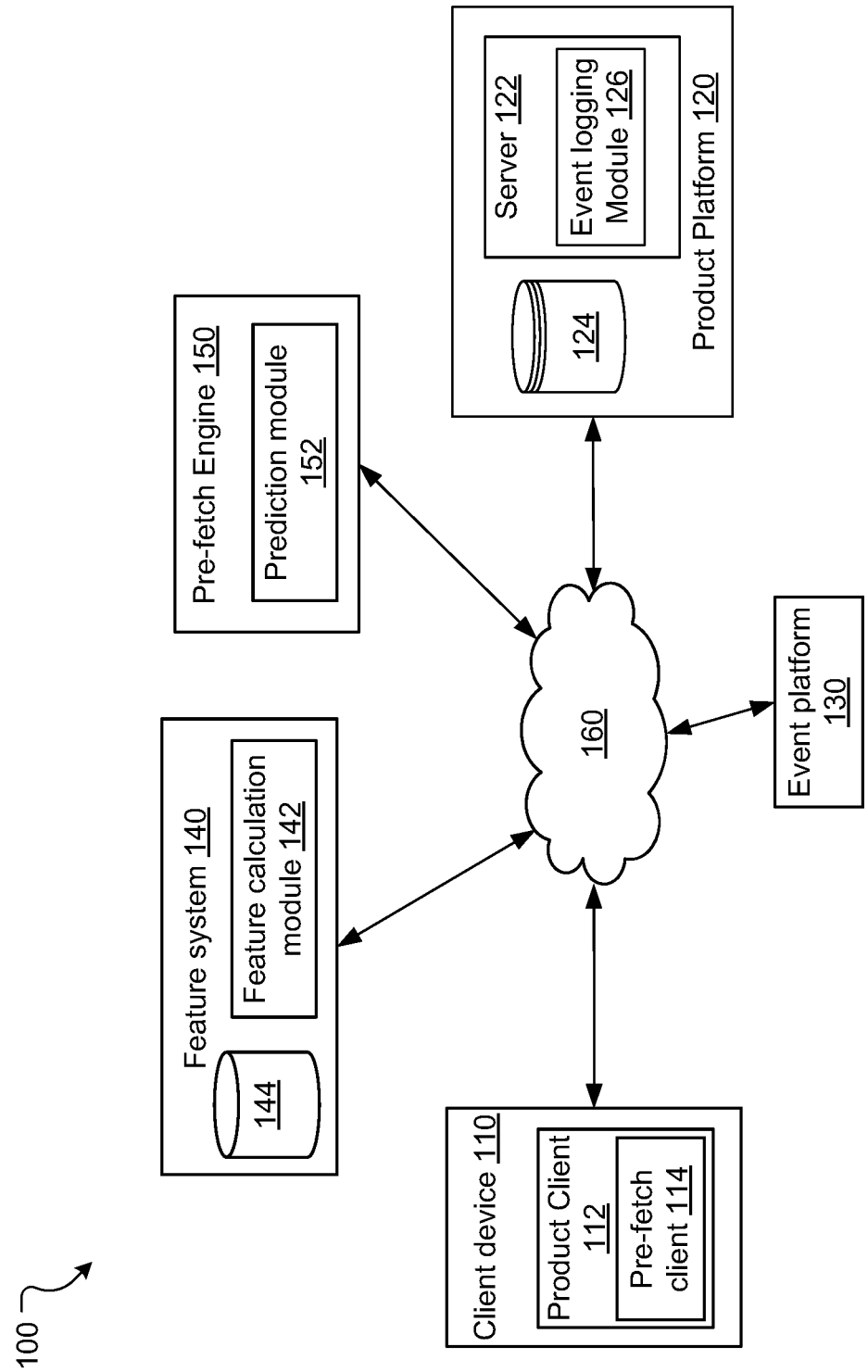
FIG. 1 is a block diagram of a networked environment according to some embodiments of the present disclosure.

While the invention is amenable to various modifications and alternative forms, specific embodiments are shown by way of example in the drawings and are described in detail.

DETAILED DESCRIPTION

It should be understood, however, that the drawings and detailed description are not intended to limit the invention to the particular form disclosed. The intention is to cover all modifications, equivalents, and alternatives falling within the spirit and scope of the present invention as defined by the appended claims.

In the following description, for the purposes of explanation, numerous specific details are set forth in order to provide a thorough understanding of the present invention. It will be apparent, however, that the present invention may be practiced without these specific details. In some instances, well-known structures and devices are shown in block diagram form in order to avoid unnecessary obscuring.

As discussed previously, some conventional input controls allow users to select items from an underlying database. Consider the example of a selector control that is used to select a user—e.g., to assign a particular issue to the user, to mention the user, or to share a content item with the user within an organization. In these cases, if the organization employs thousands if not hundreds of thousands of employees, the underlying database from within which results are to be displayed in the selector control can be very large. If the user does not enter any text, the selector control may present the entire collection of entries in the database sorted alphabetically or based on some other parameter. This can be very time consuming to sift through to identify the person the user wishes to select. In such cases, users typically enter a few characters in the search text area to refine the list of results. For example, the user might enter the text "John". However, if the company has 50 employees with "John" as a first, middle or last name, the selector control may return a list of all 50 employees—sorted based on a degree of match between the query and the person's name. In this case as well the user would have to sift through a large list of names to find the particular "John" they were looking for and select that John.

Some input controls may be configured to return a list of users that the selector selects most often. This might be efficient in some situations, e.g., in a social media setting, where a user always shares content items with the same people and/or mentions the same people frequently. However, in team-based organizations where a user may work with different teams and may frequently assign issues in one project to the same 2-3 people, but to different people in other projects, ordering the list of results based on how often a selector selects a person may not always return the most accurate results at the top of the list. This is because, a person making the selection might work more extensively in one project and assign 50 issues in that project on a daily basis, but infrequently work on another project where he occasionally assigns projects. In this case, the people that the selector assigns issues to in the first project may always appear at the top of the returned results (because they are selected more often) irrespective of the project in which the selector wishes to assign issues.

Accordingly, some conventional input controls may not be appropriate in all situations. To address one or more of these issues, intelligent input controls may be provided. One example of such an Intelligent input control is provided in U.S. patent application Ser. No. 16/914,043, Titled, "Intelligent Selector Control for User Interfaces", the entirety of which is incorporated herein by reference. The intelligent input control described in the above US Patent Application not only takes the person making the selection into consideration but also the context in which the input control is implemented and returns a list of sorted data results that are most relevant to that particular person making the selection in that particular context.

To do this, the intelligent input control employs a powerful backend system that continuously monitors interactions of users with product platforms on which the input control is executed and interactions of users with other users on that platform to predict the most likely selections a person making a selection may wish to make via the input control and provides a list of results to the input control based on this prediction. Further, each time the user makes a selection via the input control, the selection is passed back to the system as feedback to improve the predictability of the system.

In this manner the intelligent input control provides more relevant results in the input control thereby reducing the amount of time a selector spends reviewing the results and selecting the desired item.

However, it will be appreciated that the process of sending a request for the recommendations from the client device and the underlying system performing the analysis and returning the recommended data back to the client device to be displayed in the input control takes a finite amount of time. If the time taken to perform this process is too long, the person making the selection may be able to enter a longer search string and obtain the result they are looking even before the system returns the list of recommended data results and the utility of the intelligent input control may be lost.

To overcome this, when a client device renders a user interface including one or more input controls, the system may be configured to pre-fetch the recommended data results for the included input controls and store this data in a local cache. Prefetching minimizes load times, makes the user interface more responsive, and reduces the time taken to complete tasks. Subsequently, when the user interacts with the input control, these pre-fetched results can be provided immediately from the local cache so that the user can quickly make a selection.

Although this may solve the latency issue and improve the user experience, performing the background analysis and prefetching results for all the input controls for every rendered user interface significantly increases the load on the backend server.

Further, there are many situations where a user views a user interface including one or more input controls, but does not edit any of the input controls. For example, it was found that for an issue tracking system such as Jira®, the number of times issues were viewed in a day was in the range of 22 million whereas the number of times an input control was edited in a day was in the range of 880 thousand. That is, only about 4% of all issues viewed in a day were edited. In such cases, performing the analysis and prefetching the results for input controls in all viewed issues may unnecessarily increase the volume of queries at the backend server without any perceivable improvement in the user experience.

To address this, aspects of the present disclosure provide systems and methods for intelligently pre-fetching input control values for input controls that are likely to be edited in a given user interface. In particular, the disclosed systems and methods predict whether an input control is likely to be edited and only pre-fetches data for the input controls that have a high likelihood of being edited. This way, the presently disclosed systems and methods not only reduce latency in displaying recommended data results for input controls that are likely to be edited but also reduces the number of calls made to the backend server to retrieve the data as the data is not retrieved for all rendered input controls, but only the ones that are likely to be edited.

To this end, the disclosed systems and methods retrieve context information from the rendered user interface, including e.g., identifier of a user viewing the user interface, the type of user interface, the number and type of input controls present in the user interface, the state of the user interface, etc., and retrieves historical data associated with the user, the user interface type, the input controls, and the state of the user interface to determine whether the user is likely to edit one or more of the displayed input controls. If it is determined that an input control is likely to be edited, the backend server can compute the recommended data results for that input control and these data results can be pre-fetched and stored in a local cache in the client device. If it is determined that the input control is not likely to be edited, no input control data is pre-fetched.

It will be appreciated that although some embodiments of the present disclosure are described with respect to the type of intelligent selector controls described in co-pending patent application Ser. No. 16/914,043, the disclosed embodiments are not restricted to be used in respect of those intelligent selector controls. Instead, embodiments of the present disclosure can be implemented in any type of selector control that is configured to retrieve values from a remote database/server, including, e.g., selector controls that provide results based on historical usage data of the user or other users (e.g., based on previous interactions of a user with the selector control, or based on interactions of multiple users with the selector control), or selector controls that do not implement intelligence in predetermining or predicting user input for the selector control.

These and other aspects of the present disclosure will be described in detail with reference to FIGS. 1-4 below.

FIG. 1 illustrates an environment 100 in which one or more aspects of the present disclosure are implemented. Specifically, FIG. 1 illustrates the various systems involved in intelligently prefetching input control data according to embodiments of the present disclosure. The systems include client device 110, a product platform 120, an event platform 130, a feature system 140, and a pre-fetch engine 150. The client device 110, product platform 120, event platform 130, feature system 140, and pre-fetch engine 150 communicate with each other over one or more communication networks 160.

The client device 110 may be any suitable device, for example a mobile device (e.g. a tablet or mobile phone), a portable device (such as laptop computer), or any other computing device (e.g. a desktop computer).

As illustrated in FIG. 1, the client device 110 includes a product client 112 configured to access a software application made available by the product platform 120. The client 112 may communicate with the software application hosted by the product platform 120, render user interfaces based on instructions received from the application, and receive inputs from user accounts allowing them to interact with the application hosted by the product platform 120. In certain embodiments, the client 112 render user interfaces that include one or more input controls and communicate with the pre-fetch engine 150 to pre-load data for the one or more input controls.

In addition, the client 112 includes a pre-fetch client 114. The pre-fetch client 114 is configured to retrieve context data associated with the user interface rendered on the client device 110, retrieve the identifier of the user viewing the user interface, and forward this data to the pre-fetch engine 150. Further, the pre-fetch client 114 is configured to receive a list of input controls to pre-fetch from the pre-fetch engine 150 and forward this list of input controls to the product platform 120 to retrieve results for the input control from the product platform 120. The pre-fetch client 114 may also be configured to store the received results in a local cache on the client device 110 and retrieve (and render) the results from the local cache whenever a user interacts with one of the input controls for which results are stored in the local cache.

The client 112 may be implemented in various ways. For example, the client 112 may be a web browser application, which accesses the application hosted by the product platforms 120 via appropriate uniform resource locators (URL) and communicates with the platform via general worldwide-web protocols. In this case, the web browser application is configured to request, render and display user interfaces that conform to a markup language, and may be capable of internally executing browser-executable code, or other forms of code. Alternatively, the client application 120 may be a specific application programmed to communicate with the product platform 120 using defined application programming interface (API) calls.

In general, the product platform 120 is a system entity that hosts one or more software applications and/or content. The product platform 120 may include one or more servers 122 for hosting corresponding software application(s) and one or more databases 124 for storing application specific data. Examples of software applications hosted by the product platform 120 include collaborative applications (e.g., Confluence®), software code management applications (e.g., Bitbucket®), and issue tracking applications (e.g., JIRA®). Jira, Confluence, and BitBucket are all offered by Atlassian, Inc. It will be appreciated that the software applications need not be offered by the same organization and that the presently disclosed pre-fetch engine 150 can be used with any product platform without departing from the scope of the present disclosure.

In order to run a particular application, the server 122 includes one or more application programs, libraries, APIs, or other software elements that implement the features and functions of the application. In one example the product server 122 includes an event recording module 126 which monitors user account interactions with the product applications hosted by the server 122 and forwards records each of these user account interactions to the event platform 130 as an event record. The event recording module 126 may be configured to communicate the event records to the event platform 130 either as a continuous stream or in batches periodically.

The product platform 120 also stores product data. Product data generally includes: data defining the operation of the hosted application (for example, user accounts, user permissions, and the like); and application data (i.e., the content hosted/maintained by the application, which can be, for example, issue data (in an issue tracking system), page/document data (in a content management system), source code data (in a source code management system), etc.). The data is stored on and managed by database 124. Database 124 is provided by a database server which may be hosted by server 122, but is more typically hosted on a separate physical computer in communication (directly or indirectly via one or more networks) with the server 122.

While single server architecture has been described herein, it will be appreciated that the product platform 120 can be implemented using alternative architectures. For example, in certain cases a clustered architecture may be used where multiple server computing instances (or nodes) are instantiated to meet system demand Conversely, in the case of small enterprises with relatively simple requirements, a product platform 120 may be a stand-alone implementation (i.e., a single computer directly accessed/used by the end user).

The event platform 130 is communicatively coupled to the product platform 120 to receive event records and communicatively coupled to the feature system 140 to provide requested event records. In certain embodiments, the event platform 130 is designed based on a publish-subscribe model. That is, the product platform 120 sends event records to the event platform 130 and consumers (such as the feature system 140) subscribe to the event platform 130 to receive certain type of event data from the event platform. In this model, the publishers categorize the event data into classes without knowledge of which subscribers there may be. Similarly, subscribers express interest in one or more classes of event data and only receive event data from the event platform 130 that is of interest to them. When the event platform 130 receives an event record, the event platform 130 matches the event record with all the subscribers who are subscribed to the event and makes a copy of the event data for each subscriber and stores a copy to the subscriber's queue or stream. In this case, the product platform 120 may submit event data to the event platform 130 and the feature system 140 may subscribe to receive event data related to user account interaction with applications running on the product platform 120 and to receive event data whenever users make selections via an input control displayed on a client device 110. StreamHub® offered by Atlassian, Inc. is one example of such an event platform 130.

The feature system 140 is configured to receive requests from the pre-fetch engine 150 and respond to these requests. In addition, the feature system 140 includes or is associated with a feature calculation module 142, which computes features and a feature store 144, which stores the computed features.

Features are generated based on interaction between users and product applications. Generally speaking, users of the client device 110 are associated with a user account and generate electronic activity on the product client 112. This activity includes any type of user account interaction with the product platform 120, including interactions with content and/or software applications hosted by the product platform 120. Example interactions include creating or editing content, commenting on content, visiting web pages, sharing, liking, or viewing content, mentioning another user, assigning an issue to another user, etc. The feature calculation module 142 (in communication with the product platform 120 and event platform 130) monitors this user account activity to generate features. It will be appreciated that the feature calculation module 142 continuously/periodically calculates features as interactions are detected and stores these calculated features in the feature store 144.

The pre-fetch engine 150 is configured to receive a list of input controls displayed on the client device 110 from the client 112, receive values of one or more features from the feature system 140 and return a list of input controls that should be pre-fetched to the client 112. In order to determine the list of input controls that should be pre-fetched, the pre-fetch engine 150 includes a prediction module 152 that is configured to utilize contextual information associated with the input control along with the feature values to predict whether an input control is likely to be edited or not. In some embodiments, the prediction module 152 may include one or more heuristic rules to make this determination. In other embodiments, the prediction module 152 may include one or more machine learning models that may be utilized to make the prediction. Functionality of the pre-fetch engine 150 will be described in detail with respect to FIGS. 2-4.

As illustrated in FIG. 1, communications between the client device 110, product platform 120, the event platform 130, the feature system 140, and the pre-fetch engine 150 are via the communications network 160. For example, the client device 110 may communicate with the product platform 120 and the pre-fetch engine 150 through a local area network (LAN) or a public network (e.g., the Internet). Furthermore, the product platform 120 may communicate with the event platform 130 over open web protocols.

It will be appreciated that although only one client device 110 and one product platform 120 have been illustrated, in operation, multiple client devices and multiple product platforms may be connected to the pre-fetch engine 150 through the network 160.

Further still, in some embodiments, the environment 100 may include an identity platform (not shown). Typically, in organizations, employees are identified by unique user identifiers. These might be the same as the user identifiers used by the employees for accessing the product platform 120 or may be different from those identifiers. An identity platform manages and links the various user identifiers used by various product platforms in the network to the user identifiers used by the organization. This way identity can be federated across the entire organization. Further the identity platform may maintain personal user information for the users which it can share with the various product platforms when requested—e.g., the user name, position, organization division, years employed by the organization, date of birth, etc. The pre-fetch engine 150 and/or the feature system 140 may query the identity platform from time to time to retrieve personal user information corresponding to user identifiers.

This section describes the features computed by the feature system 140 and utilized by the pre-fetch engine 150 to determine the input controls for which data should be pre-fetched. In the remainder of the disclosure, the functions of the pre-fetch engine 150 are described with respect to two types of input controls—an assign input control that may be utilized by an issue tracking system to allow an issue to be assigned to a particular user and a tag/label input control that may be utilized by the issue tracking system to add a label/tag to an issue. This is done for the sake of clarity and brevity and it will be appreciated that the present disclosure is not limited to determining likelihood of editing just these types of input controls, but to any other input controls, such as input controls that allow a user to be mentioned, or any other such input controls that provide multiple data options (retrieved from an underlying database) from which a user can make a selection.

As described previously, the feature system 140 maintains features, the values of which can be passed to the pre-fetch engine 150 as and when the pre-fetch engine 150 makes requests to the feature system 140.

As used in this disclosure, the term feature refers to a measureable or observable piece of information relating to a particular type of user or product interaction. The features may be of two types—user interaction features and object based features. Typically, a user interaction feature records counts of the number of times users perform particular types of interactions. For example, user interaction features can record counts of the number of times users interact with other users, the number of times a given user interacts with containers or objects in a given time period, the number of times a user mentions or assigns tasks to users in a given time period, or has been mentioned by other users in a given time period. Object based features record time related events. For example, object based features can store information about when an object was last updated, created or edited, where an object is currently part of a sprint, whether the object has currently been assigned or not, the status of the object, etc.

As noted previously, users (on their client devices 110 and through an associated user account) interact with content and/or applications hosted by one or more product platforms 120. Each time a user account interacts with a product platform 120 an event is generated. As referred to herein, an event is an interaction between a user account and content/applications hosted by product platforms 120. Examples of events include, without limitation—making a selection via an input control, creating, assigning, approving, and labeling or tagging issues in an issue tracking system. Other events can include posting messages in an interactive chat application, a social media application, a forum, or a blog; liking, sharing, mentioning, or responding to posts; creating, editing, or commenting on pages in a wiki, committing source code, approving pull requests, creating pull requests, etc., in a source code management system, etc. This list of example events is non-exhaustive and any other type of interactions with the product platforms (e.g., opening a page, raising an incident ticket in an issue tracking system) can also be considered within the scope of the term "event".

When an event is detected, the product platform 120 on which the event occurs generates information in respect of the event (in the form of an event record) and forwards this to the event platform 130. The event platform 130 then checks the event record to determine if the feature system 140 has subscribed to the information present in the event record. If the event platform 130 determines that the feature system 140 has subscribed to information in the event record, the event platform 130 forwards the record to the feature system 140.

In some embodiments, the feature system 140 may request the following information for each user account interaction event detected by the product platform 120 and received at the event platform 130—

Principal identifier—this is the unique user account identifier of the user that interacted with a product platform that generated the event, Product platform identifier—this is a unique identifier of the product platform on which the event was recorded.

Tenant Identifier—this is a unique identifier of the tenant associated with the product platform. In some cases, a particular organization may setup a single tenant and therefore have a single tenant identifier for a particular product platform. In other cases, an organization may setup multiple tenants and therefore have multiple tenant identifiers for a particular product platform.

Object identifier—the content that the user interacted with on the product platform 120 is referred to as an "object" in this disclosure. The object may be an issue in an issue tracking system, a page in a wiki, a commit in a repo in a source code management system, etc. The object identifier is the unique identifier of the object the user interacted with when the event was generated.

Container identifier—this is the unique identifier of any hierarchical parent of the object. For example, in the case of a content management system, the parent of a page object may be a space and in the case of an issue management system, the parent of an issue object may be a project, a story, or an epic.

Timestamp—this indicates the date/time the event occurred.

Event type indicator—this field indicates the type of activity that generated the event record. Examples include, e.g., a selection event (i.e., an event generated when a user makes a selection via an input control), object creation event (i.e., an event generated when an object is created), object edit event (i.e., an event generated when a user edits an object), an assigning event (i.e., an event generated when a user assigns an object), a mention event (i.e., an event generated when a user mentions another user account in an object), a comment event (i.e., an event generated when a user posts a comment on an object), etc.

Selected user account (optional)—if the event corresponds to a user account selecting a user account via a selector control, user account identifiers of the one or more user accounts selected during the event are recorded.

In some embodiments, the feature system 140 may subscribe to all user interaction event records. In other embodiments, the feature system 140 may subscribe to specific types of interaction events. The type of interaction events requested depends on the types of input controls the pre-fetch engine 150 supports.

Once the feature system 140 receives the event data, the feature system 140 (and in particular the feature calculation module 142) utilizes data from each received event record to populate one or more features. In certain embodiments, the feature system 140 maintains different feature sets for different product platforms. Accordingly, if two product platforms 120 are connected to the feature system 140 it may maintain two feature sets—one for each platform. In some embodiments, the event data may also be sliced and diced based on the date and time of the events such that different features are created based on events that fall within certain time windows—e.g., last 7 days, 14 days, 30 days, 60 days, 90 days, etc.

In one example, features associated with the assign input control can be divided into three categories—Assignee features (i.e., features counting the total number of times a user assigns issues other users), container/object assignee features (i.e., features counting per user assigning frequency for a given container/object), and creator/assignee/reporter features. Further, these three categories may be maintained separately for each product platform and/or for different time windows. In other examples, when object based features are utilized, the features can be divided into three categories—recency features (i.e., features indicating when the object was last updated or created), usage features (i.e., features indicating whether the object is currently part of a sprint or not), and user features (i.e., features indicating whether the object is currently assigned or not), whether the issue is part of a current sprint or not, etc.

Each of these categories of features is described in the following sections.

In the example embodiments described in this disclosure, it is assumed that an organization has a single tenant identifier for a given product platform and therefore the pre-fetch recommendations provided by the pre-fetch engine 150 are scoped based on tenant identifiers. If a user works across multiple tenants, the pre-fetch engine 150 may recommend different sets of pre-fetch recommendation, which are personalized based on the user's interactions in each tenant. However, in other embodiments, the pre-fetch recommendations can be computed across different tenants, which may be useful for organizations that set up different tenants for different business units. In this case, a user in the multi-tenanted organization may be provided the same pre-fetch recommendations, which are personalized based on the user's interactions across all tenants.

The assignee feature set includes features pertaining to the frequency with which a user assigns issues to other users in total.

Table A illustrates an example 1 day assignee feature. This feature is calculated for each user and shows the number of times a user assigns objects in the last 24 hours. This feature is calculated based on issue event records. From any given assign event record, the feature calculation module 142 retrieves the user identifier of the user that assigned the object.

TABLE A

| 1 day assginee feature | |
|---|---|
| User ID | Count |
| dd155f790a4b09f8 | 5 |
| 2d16eb3587c36ebb | 2 |
| 7e304fb010115d40 | 7 |
| bdda8f8c35c2d858 | 3 |
| ... | ... |

In the example data structure, for each record, the following information is stored:

User ID—the unique identifier of the user assigned the object

Count—a count of the number of times the user assigned objects in the last 24 hours.

Table B illustrates an example 14 day container assignee feature. This feature is calculated for each user and shows the number of times a user has assigned issues in a given container in the last 14 days. This feature is calculated based on the assign event data. From any given assign event record, the feature calculation module 142 retrieves the container identifier of the issue that was assigned and the user identifier of the user that assigned the issue.

TABLE B

| 14 day container assignee feature | | |
|---|---|---|
| User ID | Container ID | Count |
| dd155f790a4b09f8 | 3874 | 5 |
| 2d16eb3587c36ebb | 3748 | 2 |
| 7e304fb010115d40 | 2813 | 7 |
| bdda8f8c35c2d858 | 8974 | 3 |
| ... | ... | ... |

In the example data structure, for each record, the following information is stored:

User ID—the unique identifier of the user that edited the object

Container ID—the unique identifier of the container

Count—a count of the number of times the user assigned issued in the corresponding container in the last 14 days.

In addition to the features that indicate the frequency of assign events occurring, the feature system 140 also stores features that indicate the creator/assignor/reporter for a given object. For instance, it maintains an author feature that maintains the author/creator of each object in a product platform 120. To this end, for each event that is received, the feature calculation module 142 retrieves the object identifier and performs a lookup in the author feature. If a corresponding object identifier is present, the event is discarded. If the object identifier is not present, a new record is created in the feature for the object identifier and the corresponding author/creator identifier is added to the record (retrieved from the event record). In case the product platform 120 offers a workflow management application, the feature system 140 maintains similar features for assignees of each task or issue and for reporters of each task or issue. However, in the case of assignees/reporter features, the feature calculation module 142 does not discard new events for objects already recorded in the assignor/reporter features. Instead, the corresponding records are updated based on the assignor/reporter information in the new events. This is because assignors/reporters in workflow management applications can change over time.

As all the features described above store feature data for a given duration, they also maintain a timestamp each time a record count is incremented. Then, each day, the count corresponding to events older than the given duration are subtracted from the count field such that at any given time, these features only shows the count of interactions that occurred in the given duration.

The object recency feature set includes features pertaining to the time when an object is updated. Table C illustrates an example object recency feature. Whenever the feature calculation module 142 receives a new event, it checks the object identifier of the object involved in the interaction and last updated time for the object based on the received event timestamp.

TABLE C

| Object recency feature | |
|---|---|
| Object ID | Last updated |
| dd155f790a4b09f8 | 20 Sep. 2020 18:32:21 |
| 2d16eb3587c36ebb | 20 Sep. 2020 18:30:01 |
| 7e304fb010115d40 | 20 Sep. 2020 18:27:18 |
| bdda8f8c35c2d858 | 20 Sep. 2020 18:21:07 |
| ... | ... |

In the example data structure, for each record, the following information is stored:

Object ID—the unique identifier of the object

Last updated timestamp—a timestamp indicating the last time the object was updated.

When the feature calculation module 142 receives a new object event record it performs a look up of the object identifier in Table C. If a corresponding record is found, the last updated timestamp for the object is updated based on the timestamp in the new object event record. Alternatively if a corresponding record is not found, the feature calculation module 142 creates a new record in Table C.

The object usage feature indicates whether an object is part of a sprint or not. In one example, for each object identifier the object usage feature stores a binary value indicating whether the object is part of a sprint or not. For example, it may store a binary 1 value to indicate that the object is part of a sprint and a binary value 0 to indicate that the object is not part of a sprint. In some examples, the feature calculation module 142 may query the corresponding product platform to retrieve a list of object identifiers that are currently part of a sprint each day. This information may then be stored in the form of a table in the feature store 144.

The object user feature is similar to the creator/assignor/reporter feature and therefore not described in detail again.

If an object is not assigned to anybody as yet, the feature may store a null value for that object.

The features can be combined in multiple different ways with contextual information retrieved from the client device depending on the type of input control the pre-fetch engine assesses. For example, an input control for selecting an assignee for a particular issue may utilize features that strongly indicate the given user is likely to edit the assignee input control whereas an input control for selecting a tag/label may utilize features that strongly indicate that the user is likely to edit the tag/label input control.

In certain embodiments, the pre-fetch engine computes the likelihood of editing an input control based on heuristic rules. The pre-fetch engine 150 maintains different heuristic rules for assessing the probability of editing different types of input controls. For example, it maintains an assignee heuristic rule set for predicting the likelihood of a user editing an assignee field in an issue and a tag/label heuristic rule set for predicting the likelihood of updating the tag/label field. In some examples, where the pre-fetch engine 150 is utilized to determine the likelihood of editing other types of input controls it may maintain corresponding rule sets for such input controls. For example, it may maintain a heuristic rule set for a mention input control.

In one embodiment, the pre-fetch system 150 utilizes the following features and contextual data for the assignee heuristic rule set—1 day assignee feature, 14 days assignee feature, 30 days assignee feature, 1 day container assign feature, 14 days container assign feature, 30 days container assign feature, issue reporter, issue assignor, issue assignee, issue status category, issue priority, issue create/update dates, and issue currently in sprint In one embodiment, the pre-fetch system 150 utilizes the following features for the tag/label heuristic rule set—Object Reporter/assignee/author feature, Current tag/label, Object reporter, Object assignor, Object assignee, Issue status category, Issue priority, and Issue create/update dates.

This section describes various methods and processes for updating features, and determining likelihood of selecting an input control.

Figure 2:
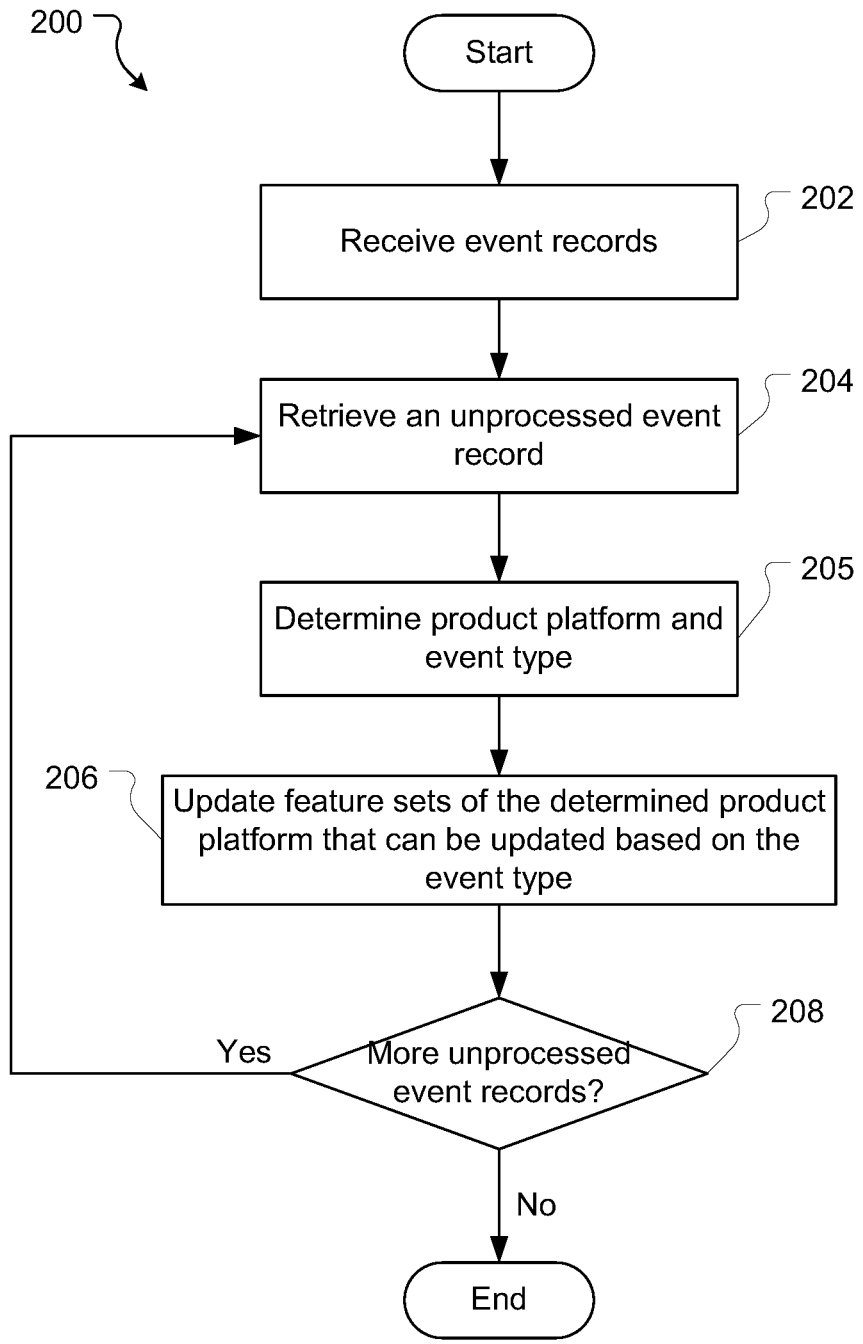
FIG. 2 is a flowchart illustrating a method for creating/updating features according to some embodiments of the present disclosure.

FIG. 2 illustrates an example method 200 for creating/updating features. Although method 200 is described with reference to a single calculation process, it will be appreciated that in practice this method is repeated periodically to calculate features in a given time period.

The method begins at step 202, where event records corresponding to a particular time window (e.g., last one hour, last 6 hours, last 12 hours, last day, etc.) are received at the feature system 140. The selected time window depends on the manner in which the feature system 140 is configured. For example, in some cases the feature system 140 may be configured to recompute the features every hour and in other cases the feature system 140 may be configured to recompute the features every day. The selected recomputing frequency may depend on a number of factors such as computation power required for the computing, the available computation power of the feature system 140, etc.

In certain embodiments, the event platform 130 pushes event records to the feature system 140 either in real time (i.e., whenever an event occurs) or at predetermined intervals (e.g., every 15 minutes, every hour, etc.). In case event records are pushed at predetermined intervals, the feature calculation module 142 receives a batch of event records for events that were generated during that interval and stores these event records until it is time to compute the features.

In other embodiments, the feature system 140 may pull event records from the event platform 130 in real time, e.g., by utilizing webhooks (programmed into the software applications and tools hosted by the event platform 130) that notify the feature system 140 when events are available at the event platform 130 or by requesting the event platform 130 at predetermined intervals (e.g., every minute, every 5 minutes, etc.) to provide event records that were generated in that interval. The feature system 140 stores these event records until it is time to compute the features.

In any case, for the received event records, the feature system 140 receives relevant data in respect of the event which may, depending on the implementation, include metadata and/or content. In one example, the event record includes the data fields described previously.

At step 204, an unprocessed event record from the set of event records for that time window is selected.

At step 205, the object identifier associated with that unprocessed event record is retrieved from the event record and the feature calculation module 142 determines the product platform the event record is associated with and the type of event is represents. In certain embodiment, the product platform is identified based on the product platform identifier received as part of the event record and the event type is determined based on the event type identifier received as part of the event record.

Next, at step 206, the feature calculation module 142 updates the features maintained in the feature store 144 for the identified product platform using the selected event. Further, within the feature sets maintained for the identified product platform, the feature calculation module 142 updates the features that can be updated based on the identified event type. For instance, if the feature calculation module 142 determines that the event record is associated with product platform 120A and the event type is an assign event, it updates the assignee features, and the container assignee features.

As described previously, if the feature calculation module 142 determines that a record already exists in any of the above identified features, it updates the count of the corresponding record. Alternatively, if the feature calculation module 142 determines that a record does not already exist in any of the above identified features, it adds a new record to the corresponding feature with a count of 1.

At step 208, the feature calculation module 142 determines whether any unprocessed event records exist in the event records retrieved at step 202. If it is determined that one or more unprocessed event records exist, the method returns to step 204. Alternatively, if a determination is made that no unprocessed event records remain, the method 200 ends.

As the features described above store feature data for a given duration, they also maintain timestamps of each time the features are computed/recomputed. Once method 200 is completed for a given time window, feature records maintained in the corresponding features that corresponds to events older than the given duration for that feature are removed from the features such that at any given time, these features only shows the count of interactions that occurred in the duration associated with the feature. For example, if a feature maintains counts of a particular type of interaction for a 14 day period and the periodicity of method 200 is 6 hours, at the end of method 200, feature counts that correspond to the first 6 hours of the 14 day period are subtracted from the total feature count such that a rolling 14 day feature count is maintained.

Method 200 is described where features are calculated periodically, in a batched fashion. In other embodiments, some or all of the features are calculated in a streaming fashion—i.e., in real time as events are generated and/or received at the feature system 140. Steaming feature calculation may be useful for shorter time window features—i.e., 1 hour features where the counts can quickly change or for non-time window features such as assignee/reporter/author features. For calculating features in the streaming fashion, a similar method is employed, but instead of receiving a batch of events and then executing steps 204-206 for each event record, method steps 204-206 are performed as and when event records are received at the feature system 140.

Accordingly, using method 200, the feature calculation module 142 creates and maintains the feature store 144. This feature store 144 is updated periodically based on the selected re-computation frequency. Furthermore, the features stored in this feature store 144 is subsequently analyzed to respond to recommendation requests from the pre-fetch client 114. These functions will be described in detail in the following sections.

Figure 3:
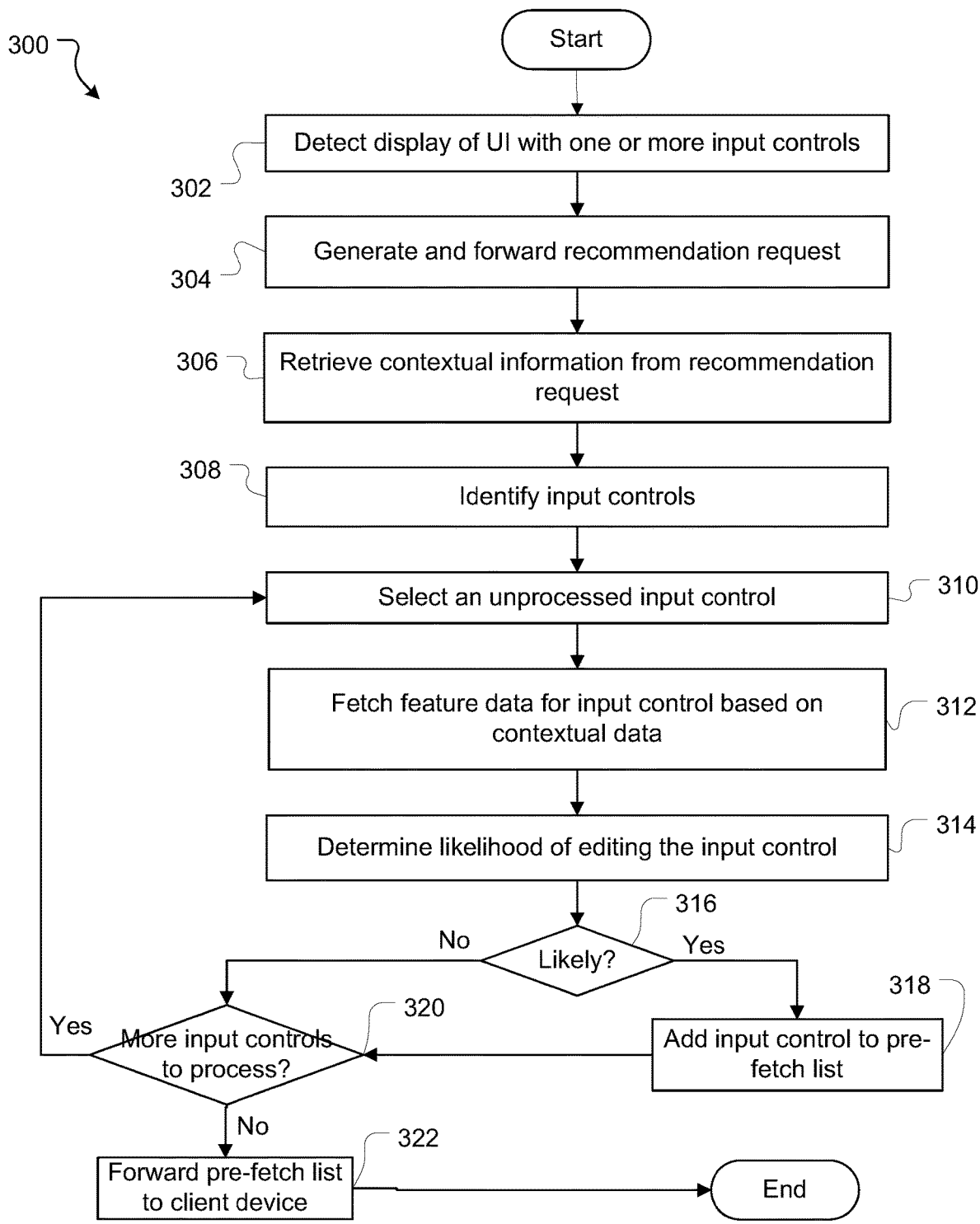
FIG. 3 is a flowchart illustrating an example method for determining whether data for an input control is to be pre-fetched according to some embodiments of the present disclosure.

FIG. 3 illustrates an example method 300 for determining whether data for an input control is to be pre-fetched according to some embodiments of the present disclosure.

The method begins at step 302, where a client device 110 detects rendering of a user interface with one or more input controls. In one example, the client device 110 (and in particular the client 112) detects selection of an object—e.g., an issue, a content page, or a similar object and renders the user interface for displaying the contents of the object. In certain embodiments, the client 112 (or the pre-fetch client 114) determines whether there are any input controls in the rendered object that require data from the product platform 120. In one example, the pre-fetch client 114 may have a lookup table of input controls that require data from the product platform 120. If any of the input controls in the rendered object user interface match one or more of the input controls in the lookup table, the pre-fetch client 114 can determine that the rendered object includes input controls that require data from the product platform 120. Alternatively if the rendered object does not have any input control and/or does not have any input controls that match the input controls in the lookup table, the pre-fetch client 114 can determine that the rendered object does not include any input controls that require data from the product platform 120.

The method 300 ends if no input controls that require data from the product platform 120 are identified. Alternatively, if a determination is made that one or more such input controls exist, the pre-fetch client 114 generates a recommendation request at step 304. The recommendation request includes information uniquely identifying the request, such as a request identifier and an identifier of a client device from which the request is sent. In addition, the recommendation request may include the following contextual information—

Input control ID—a unique identifier of the particular include input control.

Input control type ID—this identifier indicates the input control type and it may be used by the prediction module 152 when calculating the likelihood of editing the input control.

Principal ID—this is the identifier of the user viewing the rendered object.

Product ID—indicates which product platform the object is associated with.

Tennant ID—a unique value identifying the particular organization that is using the product platform. For example, if the product is an issue tracking system, and the organization using the issue tracking system is organization A, the Tennant ID uniquely identifies organization A.

Container ID—unique identifier identifying the container with which the object is associated. For example, if the object is an issue, the container ID may be a project ID or epic ID.

Object ID—unique identifier of the rendered object. If the object is an issue, this will be the issue identifier. In another example, if the object is a content page, this will be the page identifier.

In addition to this, the recommendation request may include additional contextual information, depending on the type of object. For example, if the object is an issue, the contextual data may further include a current assignee for the issue. This field may include either the user identifier of the current assignee or may indicate that no assignee is currently assigned to the issue. Further still, if the object is an issue, the recommendation request may include an issue status indicator that indicates the current status of the issue—e.g., if it is pending, to do, open, closed, resolved, etc.

Other information provided as part of the recommendation request in case the object is an issue includes information indicating the priority of the issue and/or whether the issue is part of a sprint.

It will be appreciated that the more context information provided as part of the recommendation request, the more accurate the recommendation generated by the pre-fetch engine 150 is. Further, it will be appreciated that the amount of information and the type of information provided by the pre-fetch client 114 to the pre-fetch engine 150 depends on configuration of the pre-fetch client 114 within the product platform 120 and in particular within the interface displayed by the product platform 120. For example, developers of some product platforms 120 may configure the pre-fetch client 114 to only retrieve the product, tenant, container and object identifiers from the product platform 120 when the object is rendered on the client device. In another example, developers may configure the pre-fetch client 114 to retrieve the current assignee, object status, object priority, object create and update dates in addition to the product, tenant, container, and object identifiers when generating the recommendation request.

The generated recommendation request is forwarded to the pre-fetch engine 150 at step 304.

At step 306, the pre-fetch engine retrieves the contextual information from the recommendation request. And in particular retrieves the input control identifiers and input control type identifiers of the one or more input controls provided as part of the recommendation request.

At step 308, the types of input controls are identified from the input control type identifiers. As noted previously, the input control type identifier indicates the input control type. This information is utilized by the pre-fetch engine 150 in calculating the likelihood of editing the input control. This is because the pre-fetch engine 150 may utilize different rules for assessing likelihood of editing the input control based on the type of control. For example, different sets of rules may be applied for an assignee input control and a different set of rules may be applied for a label/tag or a mention input control. At step 308, the pre-fetch engine 150 determines the number of input control received as part of the recommendation request and their types.

Next at step 310, an unprocessed input control is selected.

Subsequently, (i.e., at step 312), the pre-fetch engine 150 retrieves feature data for the selected input control based on the contextual data. This includes multiple sub-steps. The pre-fetch engine 150 identifies the heuristic rules that should be applied based on the input control type identifier of the selected input control. To this end, the pre-fetch engine 150 may include a look-up table that includes a list of input control type identifiers and corresponding rules that should be used. The input control type identifier of the selected input control is matched with the input control type identifiers stored in the look-up table and the corresponding rules that correspond to the match input control type identifier are retrieved from the look-up table.

Based on the identified rules, the pre-fetch engine 150 identifies the features required for the selected rules. For example, if the selected input control is identified as an assignee control and the corresponding rules are identified as the assignee heuristic rules, the pre-fetch engine 150 determines the features required as part of the heuristic rules (e.g. as described previously). This information may also be retrieved from a look-up table/database in a similar manner.

Once the required features are identified, the pre-fetch engine 150 sends a request to the feature system 140 to retrieve values for the selected features. For instance, using the previous assignee input control example, the pre-fetch engine 150 retrieves values for the list of features described previously as features utilized for the assignee heuristic rules. In particular, the pre-fetch engine 150 retrieves the product ID, container ID and object ID (if provided) from the recommendation request and the user identifier and requests the feature system 140 to provide values of the selected features that correspond to the product ID, container ID and/or object ID and the user ID. For example, the pre-fetch engine 150 can retrieve the counts of the number of times the user ID assigned issues in the particular product and container ID for different time windows. Similarly, if the input control is a mention input control, the pre-fetch engine may retrieve the number of times the user ID mentions users in the particular product and container ID for different time windows.

Next (at step 314), the pre-fetch engine 150 determines the likelihood of editing the input control. In the example of an assign input control, the pre-fetch engine may determine that there is a high likelihood of editing the input control if the pre-fetch engine determines that there is no current assignee assigned to the issue (based on the assignee identifier for the particular issue), the issue status received as part of the contextual data indicates that the issue is currently pending (e.g., issue status is 'to do' or something similar), and a total assign ratio for the particular user identifier is above a threshold value.

The total assign ratio may be calculated based on the retrieved values for the assignee features. In particular, the total assign ratio can be calculated as the number of times the user assigns issues to other users for the corresponding container ID/the total number of times the user assigns issues for the corresponding container ID. If the assign ratio is low (indicating that the user assigns issues to himself/herself more often that assigning to other users), it may be likely that the user will assign the present issue to himself/herself and in that case, it may not be necessary to pre-fetch the recommended list of assignees for the selected assignee input control. Alternatively, if the total assign ratio is high (indicating that the user assigns issues to other users more often than to himself/herself), it may be likely that the user will assign the present issue to another user and in that case, it may be warranted to pre-fetch the recommended list of assignees for the selected input control. The threshold total assign ratio may be set to any value, depending on implementation. For example, in more inclusive systems, the threshold value may be set to a lower value, whereas in more restrictive systems, the threshold value may be set to a higher value. In one example, this value may be set to 0.66.

In another example, the pre-fetch engine 150 may employ one or more additional or alternative rules for determining likelihood of editing the input control. For example, it may consider the sprint status, priority status and/or issue update dates. If it is determined that the issue is part of a sprint, has a high priority status and/or the issue creation/update dates are within a threshold period, the pre-fetch engine 150 may determine that there is a high likelihood of editing whereas if the object is not part of a sprint, priority status is low and/or the issue creation/update dates are outside a threshold period it may determine that there is a low likelihood of editing. This is because, issues in sprint and/or high priority issues are typically more likely to be assigned. Similarly, issues that are created or updated recently are generally more likely to be assigned.

In another example, if the issue is already currently assigned to a user identifier, the pre-fetch engine compares the user identifier of the current assignee with the user identifier of the user received as part of the recommendation request. If the identifiers do not match (indicating that the user viewing the issue is not assigned to the issue), it is likely that the user is simply viewing the issue and is unlikely to edit the assignee input control. In this case, the pre-fetch engine 150 may determine that the likelihood of editing the input control is low. Alternatively, if the user identifier of the current assignee matches the user identifier of the user received as part of the recommendation request (indicating that the user viewing the issue is assigned to the issue), it is likely that the user may edit the assignee input control. In such cases, the pre-fetch engine 150 determine that the likelihood of editing the input control is high.

Alternatively, if the input control is a tag/label input control, the pre-fetch engine may determine that there is a high likelihood of editing the input control if the pre-fetch engine determines that there are no current labels/tag applied to the issue, the status of the issue is currently pending (e.g., the status is 'to do' or something similar), and the user identifier received as part of the recommendation request matches the reporter identifier or the assignee identifier.

Once the pre-fetch engine 150 has determined the likelihood of editing the input control, the method proceeds to step 316.

At step 316, a determination is made whether the determined likelihood is high or low. It will be appreciated that the determination at step 314 may result in a percentage or absolute likelihood value (e.g., a value between 0 and 1, where 0 indicates no likelihood of editing and 1 indicates a 100% chance of editing). Alternatively, the determination may result in a binary output—True (for high likelihood of editing) and False (for low likelihood of editing). In the case of a binary output, the output may be derived based on a comparison of a percentage or absolute likelihood value with a threshold percentage/value. For example, a likelihood percentage below 65% may result in a false or low likelihood value whereas a likelihood percentage above 65% may result in a true or high likelihood value. Similarly a likelihood value below 0.5 may result in a false or low likelihood whereas a likelihood value above 0.5 may result in a true or high likelihood.

In any event, if at step 316 it is determined that the determined likelihood is high, the method proceeds to step 318 where the input control identifier is added to a pre-fetch list. Alternatively, if the determined likelihood is low, the method proceeds straight to step 320 where the pre-fetch engine determines if there are any other input controls received as part of the recommendation request that have not yet been processed. If any such input controls are identified, the method is repeated from step 310.

Alternatively, if a determination is made that no more unprocessed input controls remain (e.g., because there was only one input control in the recommendation request or all input controls have been processed), the method proceeds to step 322 where the pre-fetch list is forwarded to the client device. The pre-fetch list includes the input control identifiers of all the input controls the pre-fetch engine 150 determined were likely to be edited.

Once the client device 110 receives the pre-fetch list, the client 112 forwards the input control identifiers in the pre-fetch list to the product platform 120 to pre-fetch results for the input controls. In one example, the product platform 120 can apply a process similar to that described in FIG. 4 of U.S. patent application Ser. No. 16/914,043, Titled, "Intelligent Selector Control for User Interfaces" and in particular the method steps performed when no search string is provided as part of the recommendation request. In other examples, the product platform 120 can retrieve and forward all the results corresponding to input controls. For example, if the input control is an assignee input control, the product platform 120 may return a list of all possible users and in case the input control is a tag/label input control, the product platform 120 may return a list of all possible tags/labels.

The client device 110 then stores the pre-fetched values in a local cache. When a user selects the corresponding input control, the pre-fetched values are directly retrieved from the local cache.

In the embodiments described above, the likelihood of editing an input control is determined based on heuristic rules. In another embodiment, one or more machine learning models may be utilized to determine the likelihood.

When machine learning models are utilized to predict likelihood of editing an input control, the machine learning models may assign weights to the feature counts and contextual data and compute aggregate scores based on the weighted features and contextual data. In some embodiments a suitable machine learning model may be utilized. Examples of such models include logistic regression models and neural networks.

Generally speaking, the machine learning models are generated based on training data. In one example, the training data includes contextual data and the features calculated for hundreds or thousands of input fields. Based on this training data, the model is trained to predict whether an input field is likely to be edited or not. To do this, a list of input controls with their contextual data is provided to the model along with corresponding outcomes of whether the input controls were edited or not. A positive outcome may indicate that the input control was edited whereas a negative outcome may indicate that the input control was not edited. The model retrieves features and contextual data for a given input control and attempts to assign weights to the features and contextual data such that the combined likelihood score for a given input control matches the corresponding outcome (i.e., a high likelihood score for a positive outcome and a low likelihood score for a negative outcome). The assigned weights are then applied to a next input control to calculate the likelihood score for that input control. If the likelihood score does not match the outcome (e.g., if the likelihood score is below a threshold value for a positive outcome), the model changes the machine learning weights to be more likely to produce the correct likelihood scores. This process is repeated numerous times with many input controls and corresponding outcomes until the model can correctly determine the likelihood of editing an input control most of the times (e.g., 90% of the times). Once this is achieved the model is considered trained.

When determining likelihood of editing an assignee input control, the pre-fetch engine 150 can train an assignee model using the features and contextual data described above with respect to heuristic rules. Similarly, when determining likelihood of editing tag/label input controls, the pre-fetch engine 150 can train a tag/label model using the features and contextual data described above with respect to heuristic rules for tag/label input controls. It will be appreciated that models can similarly be trained for other input control types.

During operation, the models are trained from time to time to improve their accuracy in determining likelihood of editing a corresponding input control.

To do this, the pre-fetch engine 150 stores input control selection events that have occurred when users have edited an input control. The pre-fetch engine 150 stores the input control selection events along with corresponding contextual data. Such input control selection events ideally represent the high likelihood calculations performed by the pre-fetch engine 150.

In one example, based on the contextual data corresponding to the input control, the pre-fetch engine 150 reruns method 300, but retrieves the feature counts that correspond to the time at which the input control selection event occurred. As described previously, the features include timestamps that indicate the state of the feature counts at different points in time. Therefore, the system can retrieve the state of the features at the time the input control selection event occurred. It then determines whether the pre-fetch engine 150 calculates a high likelihood for the particular input control by re-running method 300. If the pre-fetch engine 150 returns a high likelihood (e.g., more than 90%), the pre-fetch engine 150 ends the retraining. However, if the pre-fetch engine 150 returns a low likelihood (e.g., less than 60%) when method 300 is re-run, the pre-fetch engine 150 retrains the model to change the weights applied to the various features and contextual data associated with that particular selection event to ensure the pre-fetch engine 150 computes a high likelihood of editing. This process is repeated using a number of input control selection events and corresponding features and contextual data periodically to make sure the models compute likelihood scores accurately.

In another example, data about usage of the input control is collected. This includes, e.g., the contextual data (object, container, principal user, time, etc.). The pre-fetch engine 150 then identifies the state of the features in the feature store 144 at the time the selection was made (i.e., the counts of the various features maintained by feature store 144 at the time the selector control was used). A suitable machine learning training algorithm is then executed to fine tune one or more of the models based on these parameters.

In the embodiments describe above, the pre-fetch engine 150 receives some user and object features from the feature system 140 and other information as part of the recommendation request from the client device 110 at execution time. It will be appreciated that where more information is provided as part of the recommendation request, the pre-fetch engine 150 may not need to retrieve corresponding feature data from the feature store 140 and instead rely on the real time information received as part of the pre-fetch request. In such examples, the feature store 140 need not maintain the corresponding object features in the feature store 144. For example, if object related information such as last updated, object priority, object assignee/reporter/creator information is provided as part of the recommendation request, the feature system 140 need not maintain such object based features. Alternatively, if such information is maintained by the feature system 140, it need not be passed as part of the recommendation request from the client device 110 at execution time.

The operations/techniques described herein are implemented by one or more special-purpose computing systems or devices. For example, in environment 100: the pre-fetch engine 150 may be provided by one or more computer systems; the client device 110 is a computer system; and the product server 122 is provided by one or more computing systems.

The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hardwired logic, ASICs, or FPGAs with custom programming to accomplish the techniques. The special purpose computing devices may be desktop computer systems, portable computer systems, handheld devices, networking devices or any other device that incorporates hard-wired and/or program logic to implement relevant operations.

Figure 4:
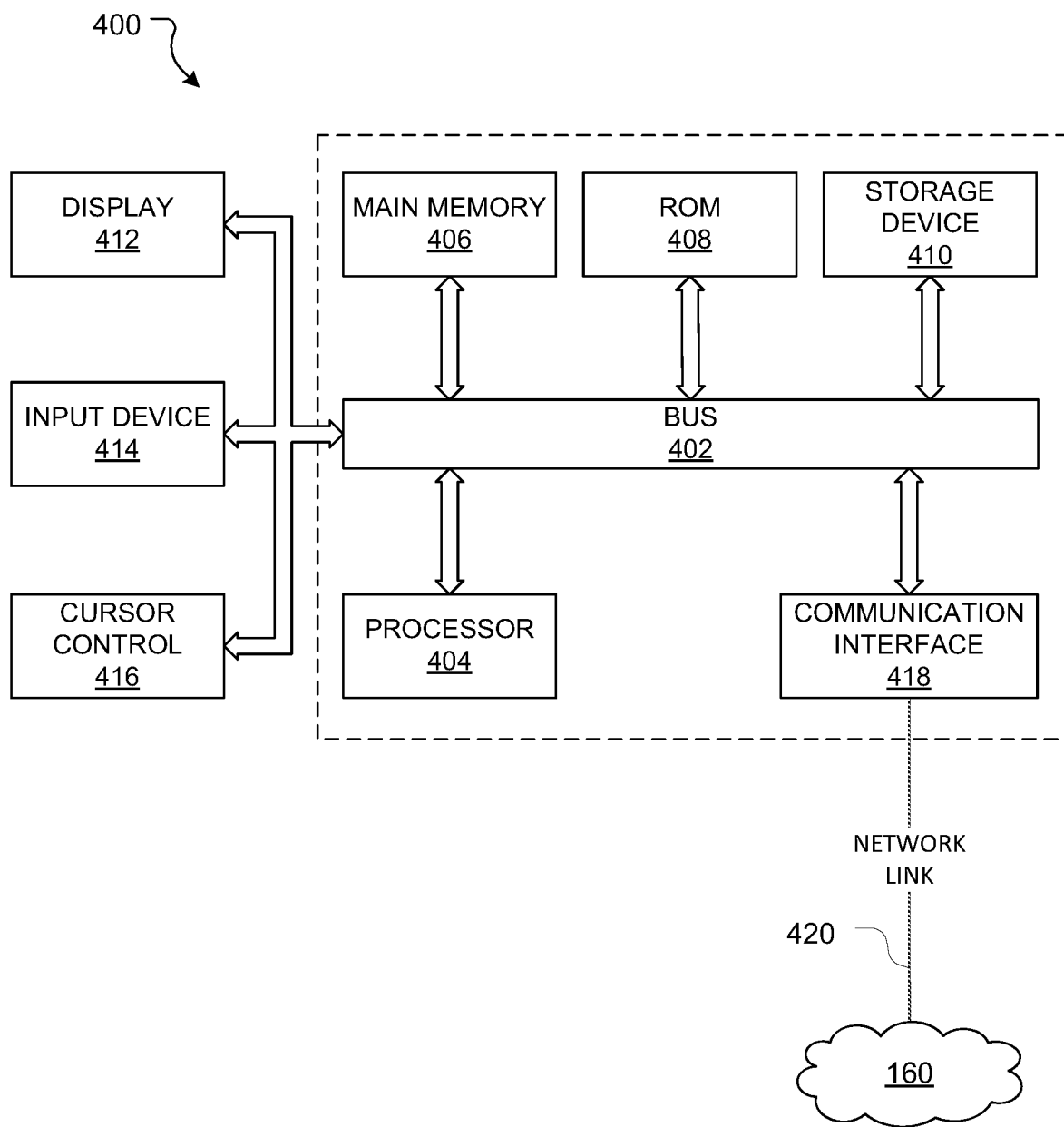
FIG. 4 is a block diagram of a computing system with which various embodiments of the present disclosure may be implemented.

For example, FIG. 4 is a block diagram that illustrates a computer system 400 upon which an embodiment of the invention may be implemented. Computer system 400 includes a bus 402 or other communication mechanism for communicating information, and a hardware processor S04 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions. If the computer system 400 is part of the feature system 140, the storage device 410 may store the feature store 144.

In case the computer system 400 is the client device 110, it may be coupled via bus 402 to one more output devices such as a display 412 for displaying information to a computer user. Display 412 may, for example, be a cathode ray tube (CRT), a liquid crystal display (LCD), a light emitting diode (LED display), or a touch screen display. An input device 414, including alphanumeric and other keys, may be coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that permits the device to specify positions in a plane. Additional and/or alternative input devices are possible, for example touch screen displays.

According to one embodiment, the methods disclosed herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory computer readable media that stores data and/or instructions that cause a machine to operation in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, hard disk, solid state drive, magnetic tape, or any other magnetic data storage medium, a CD-ROM, any other optical data storage medium, any physical medium with patterns of holes, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to network 160. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks 160 to other computing systems. For example, if the computer system 400 is part of the feature system 140, the network link 420 may provide a connection through network 160 to the event platform 130 or product platforms 120.

Computer system 400 can send messages and receive data, including program code, through the network(s), network link 420 and communication interface 418. In the feature system example, it may receive event data through the network 160 and communication interface 418 from the event platform 130.

The processor 404 of the feature system 140 may execute the received event data as it is received, and/or store it in storage device 410, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

As used herein the terms "include" and "comprise" (and variations of those terms, such as "including", "includes", "comprising", "comprises", "comprised" and the like) are intended to be inclusive and are not intended to exclude further features, components, integers or steps. Further, the terms "process" and "method" are interchangeably used.

Various features of the disclosure have been described using flowcharts. The functionality/processing of a given flowchart step could potentially be performed in various different ways and by various different systems or system modules. Furthermore, a given flowchart step could be divided into multiple steps and/or multiple flowchart steps could be combined into a single step. Furthermore, the order of the steps can be changed without departing from the scope of the present disclosure.

It will be understood that the embodiments disclosed and defined in this specification extends to all alternative combinations of two or more of the individual features mentioned or evident from the text or drawings. All of these different combinations constitute various alternative aspects of the embodiments.

What is claimed is:

1. A computer-implemented method for operating a graphical user interface on a client device, the computer-implemented method comprising:
   causing display of the graphical user interface on the client device, the graphical user interface including multiple input controls on the client device, each input control of the multiple input controls configured to display a respective list of suggested entries in response to a respective user input;
   receiving, at a product platform server, a principal identifier associated with a user of the client device;
   based on the principal identifier, identifying, at the product platform server, a set of historical interactions performed by the user with respect to the multiple input controls;
   determining a likelihood that the user will select a particular input control based on a number of interactions with respect to an input control type identified in the set of historical interactions;
   in accordance with the determined likelihood satisfying a criteria, causing a particular list of suggested entries for the particular input control to be transmitted from the product platform server to the client device; and
   in response to a user selection of the particular input control, causing display of the particular list of suggested entries on the graphical user interface.

2. The computer-implemented method of claim 1, wherein:
   the set of historical interactions includes a count associated with a historical action performed by the user; and
   determining the likelihood that the user will edit the particular input control further includes associating the historical action with the particular input control.

3. The computer-implemented method of claim 1, wherein the particular list of suggested entries is pre-fetched by the product platform server for causing display on the graphical user interface.

4. The computer-implemented method of claim 1, wherein at least one input control of the multiple input controls is not pre-fetched subsequent to causing display of the graphical user interface.

5. The computer-implemented method of claim 1, wherein:
   the criteria corresponds to a threshold level of a total assign ratio for the principal identifier; and
   the total assign ratio corresponds to a ratio of a first number of times issues are assigned to the user and a second number of times issues are assigned to users other than the user.

6. The computer-implemented method of claim 1, wherein determining the likelihood that the user will edit the particular input control further comprises:
   obtaining contextual data associated with an object displayed on the graphical user interface; and
   obtaining a predicted outcome for the particular input control using a machine learning model, the machine learning model trained using the set of historical interactions.

7. The computer-implemented method of claim 1, wherein the particular input control is at least one of an assign input control, a mention input control, or a tag input control.

8. The computer-implemented method of claim 1, further comprising processing an additional input control of the multiple input controls to determine an additional likelihood that the user will edit the additional input control.

9. A method for operating a graphical user interface for an issue of an issue tracking system, the method comprising:
   causing display of issue data corresponding to the issue tracked by the issue tracking system in the graphical user interface on a client device, the graphical user interface including multiple input controls and each input control of the multiple input controls configured to display a respective list of suggested entries in response to a respective user input;

identifying a set of historical actions associated with a user of the client device, the user of the client device identified based on a principal identifier received from the client device;

determining a likelihood that the user will select a particular input control based on a number of interactions with respect to an input control type of a particular input control of multiple input controls identified in the set of historical interactions;

in accordance with the determined likelihood, determining and transmitting suggested entries for the particular input control of the input control type to the client device; and in response to a user selection of the particular input control, causing display of the suggested entries corresponding to the particular input control.

10. The method of claim 9, wherein the set of historical actions corresponds to a number of times each input control of the multiple input controls was selected for editing by the user associated with the principal identifier.

11. The method of claim 9, wherein:
the input control type corresponds to an issue assignment control; and
the input control is an assignee selection control for the issue tracked by the issue tracking system.

12. The method of claim 9, wherein the likelihood is identified using a machine learning model trained using the set of historical actions.

13. The method of claim 9, wherein additional suggested entries are not pre-fetched prior to an additional user selection of at least one additional input control.

14. The method of claim 9, wherein the set of historical actions indicates at least one of a frequency of assign events, a creator of the issue, or an assignor of the issue.

15. The method of claim 9, wherein:
the suggested entries received at the client device are stored in a local cache of the client device; and
the suggested entries are fetched from the local cache in response to the user selection of the input control.

16. A computer system comprising:
a processor; and
a non-transitory computer readable medium storing sequences of instructions which, when executed by the processor, cause the processor to:
cause display of a graphical user interface on a client device, the graphical user interface including multiple input controls on a client device, each input control of the multiple input controls configured to display a respective list of suggested entries in response to a respective user input;
receive a recommendation request for pre-fetching data for an input control of the multiple input controls associated with an object displayed on the graphical user interface, the recommendation request including an input control type identifier and a principal identifier of a user of the client device;
based on the recommendation request, identify a set of historical interactions performed by the user with respect to the multiple input controls;
determine a likelihood that the user of the client device will select and edit the input control of the multiple input controls associated with the object displayed on the graphical user interface in accordance with a number of interactions with respect to the input control identified in the set of historical interactions; and
in accordance with the likelihood satisfying a criteria and in response to a user input of the input control, cause rendering and display of a list of suggested entries for the input control of the multiple input controls associated with the object displayed on the graphical user interface.

17. The computer system of claim 16, wherein:
the recommendation request further includes an object identifier; and
the likelihood that the user will select and edit the input control further comprises:
determining whether the object is currently assigned based on the object identifier;
determining whether a status of the object is currently pending based on the object identifier; and
determining whether a total assign ratio for the user of the client device is above a threshold value.

18. The computer system of claim 16, wherein the sequences of instructions, when executed by the processor, further cause the processor to pre-fetch the list of suggested entries for the input control.

19. The computer system of claim 18, wherein causing the list of suggested entries to be pre-fetched for the input control comprises adding the input control to a pre-fetch list.

20. The computer system of claim 18, wherein:
the list of suggested entries rendered by the computer system at the client device is stored in a local cache of the client device; and
the list of suggested entries is fetched from the local cache in response to the user input of the input control.

* * * * *